June 14, 1938. H. R. TUCKER 2,120,657
INTERNAL COMBUSTION ENGINE
Filed Jan. 6, 1937
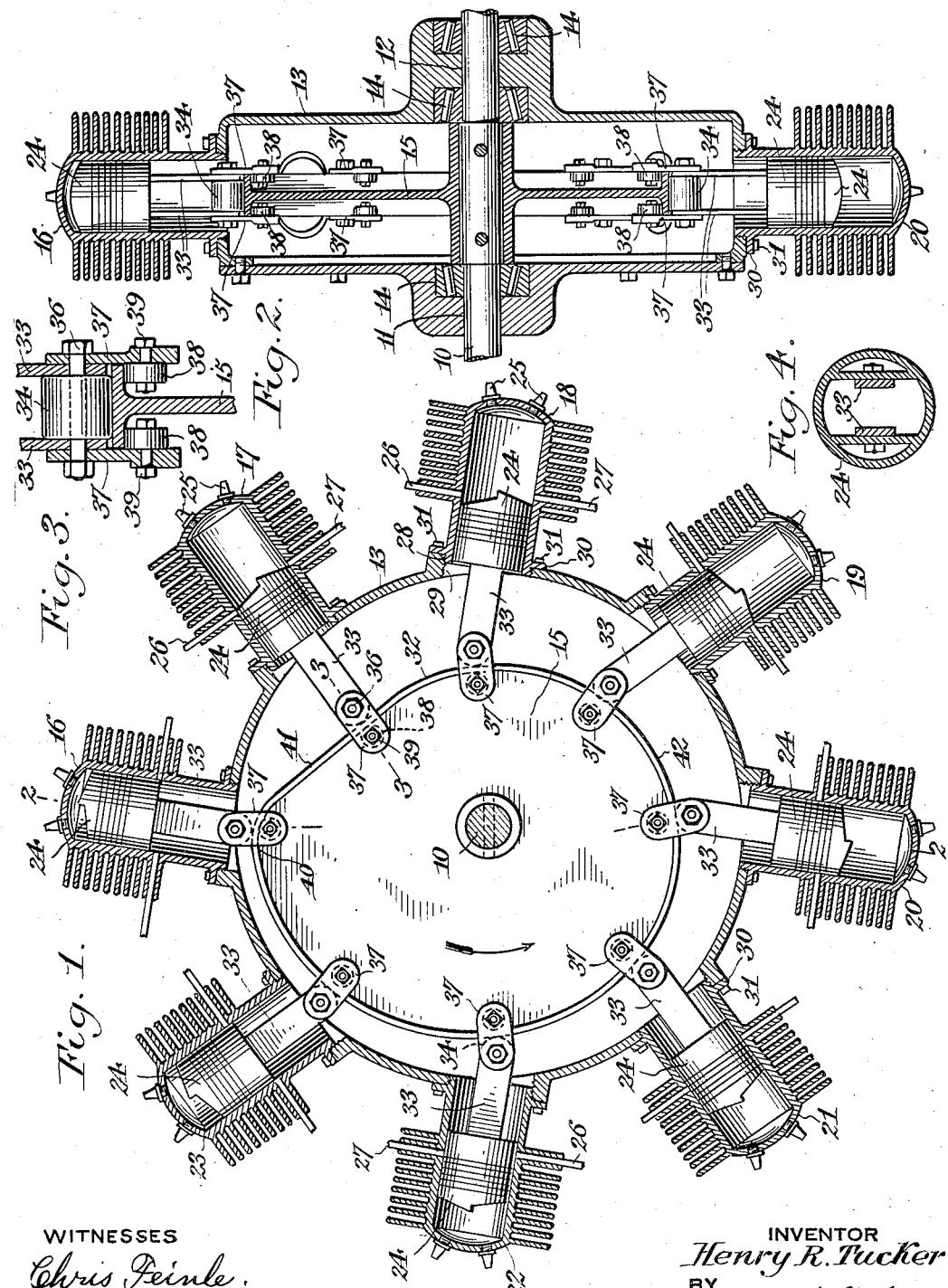
WITNESSES
INVENTOR
Henry R. Tucker
BY
ATTORNEYS.

Patented June 14, 1938

2,120,657

UNITED STATES PATENT OFFICE 2,120,657

INTERNAL COMBUSTION ENGINE

Henry R. Tucker, Pedro Miguel, Canal Zone

Application January 6, 1937, Serial No. 119,215

1 Claim. (Cl. 123—55)

This invention relates to internal combustion engines, and more particularly to a radial type engine, an object of the invention being to provide an improved construction and arrangement of cam fixed to the drive shaft of the engine and which is caused to turn through the medium of a circular series of power units, each unit including a cylinder and a piston operatively connected to the cam.

A further object is to provide an engine of this character in which the power units or cylinders and pistons are located at an angle of approximately 10° from the radius of the cam shaft.

A further object is to provide an engine of this character embodying many novel features of construction and advantages, all of which will be more fully hereinafter described and pointed out in the claim.

In the accompanying drawing—

Fig. 1 is a view in sectional elevation of my improved engine;

Fig. 2 is a view in transverse section on the staggered line 2—2 of Fig. 1;

Fig. 3 is an enlarged view in section on the line 3—3 of Fig. 1; and

Fig. 4 is a view in cross section through one of the pistons.

10 represents the cam shaft of the engine which is extended through alined openings 11 and 12 in the center of a circular cam casing 13 and provided with anti-friction bearings 14 arranged to insure minimum of friction and to take up thrusts on the shaft.

On the shaft 10 my improved cam 15 is secured and located within the casing 13. Around the casing 13 a series of cylinders are located, and while I have illustrated eight cylinders it is of course to be understood that any desired number of cylinders may be employed. For convenience of description there are shown eight cylinders which are given the reference characters 16, 17, 18, 19, 20, 21, 22, and 23, respectively. These cylinders are not on a true radius relative to the shaft 10 but are at an angle of approximately 10° relative to the radius. Each cylinder is provided with a piston 24 of the same length as the cylinder and each cylinder is of course provided with any suitable arrangement of spark plugs 25, and with an intake 26 and an exhaust 27. It is to be assumed that the intakes 26 will be operatively connected to a suitable supercharger (not shown) but, of course, other well-known engine equipment may be utilized for timing the sparks and caring for the exhaust, etc. Each cylinder is externally screw-threaded at its open end, as shown at 28, to screw into a threaded opening 29 in the casing 13, and also the several cylinders are preferably provided with flanges 30 which are secured by screws or bolts 31 to the casing.

The cam 15 is provided throughout its edge and at both sides thereof with laterally projecting flanges 32 so that the shape of the cam in cross section at its edge is of general T shape as shown most clearly in Fig. 3 of the drawing. Each piston 24 is provided with a pair of parallel bars fixed thereto and constituting a bifurcated piston rod 33 in which a roller 34 is mounted on a removable cross bolt 36 and bears against the outer edge of the cam. The pair of links 37 on the outside of each piston rod 33 are also pivotally connected to the piston rod by the bolt 36 and these links carry rollers 38 on removable bolts 39, said rollers 38 engaging the inner faces of the flanges 32. Thus it will be noted that the links may take various angles relative to the rods in the movement of the cam between the links.

Attention is particularly called to the shape of the cam 15. This cam has a single high point 40 and the working face or cam track extends from the high point in a straight line at an acute angle for a distance of approximately one-quarter of the length of the track. This straight portion is indicated by the reference character 41, and from the end of the straight portion 41 the cam track extends in a gradual curve throughout three-quarters of the length of the cam track to the single high point. This curved portion of the track will be given the reference character 42.

It will thus be noted that when my improved engine is operating as a two-cycle engine there will be a power stroke in each cylinder during one complete revolution of the cam shaft. The power stroke will be a sharp, quick stroke throughout the straight portion of the cam track, and the compression stroke of each piston will be a comparatively slow and gradual one, thus requiring but a minimum of power for compression and exerting the maximum power on the working stroke.

While I have illustrated and described what I believe to be the preferred embodiment of my invention, it is obvious that various slight changes may be made with regard to the form and arrangement of parts without departing from my invention, and hence I do not limit myself to the precise details set forth but consider myself at liberty to make such changes and alterations as fairly fall within the spirit and scope of the claim.

I claim:

In an internal combustion engine, the combination with a casing, a shaft extending through the center of the casing, a circular series of cylinders around the casing, and pistons in the cylinders, of rotary means on the shaft in the casing operatively connected to all of the pistons, said means causing the pistons a quick movement on their working strokes and comparatively slow movement on their compression strokes, and simultaneously with the working stroke of one piston cause the simultaneous movement of a plurality of pistons on their compression strokes, each piston given a single working stroke and a single compression stroke upon each complete revolution of said means.

HENRY R. TUCKER.